Figure 1:
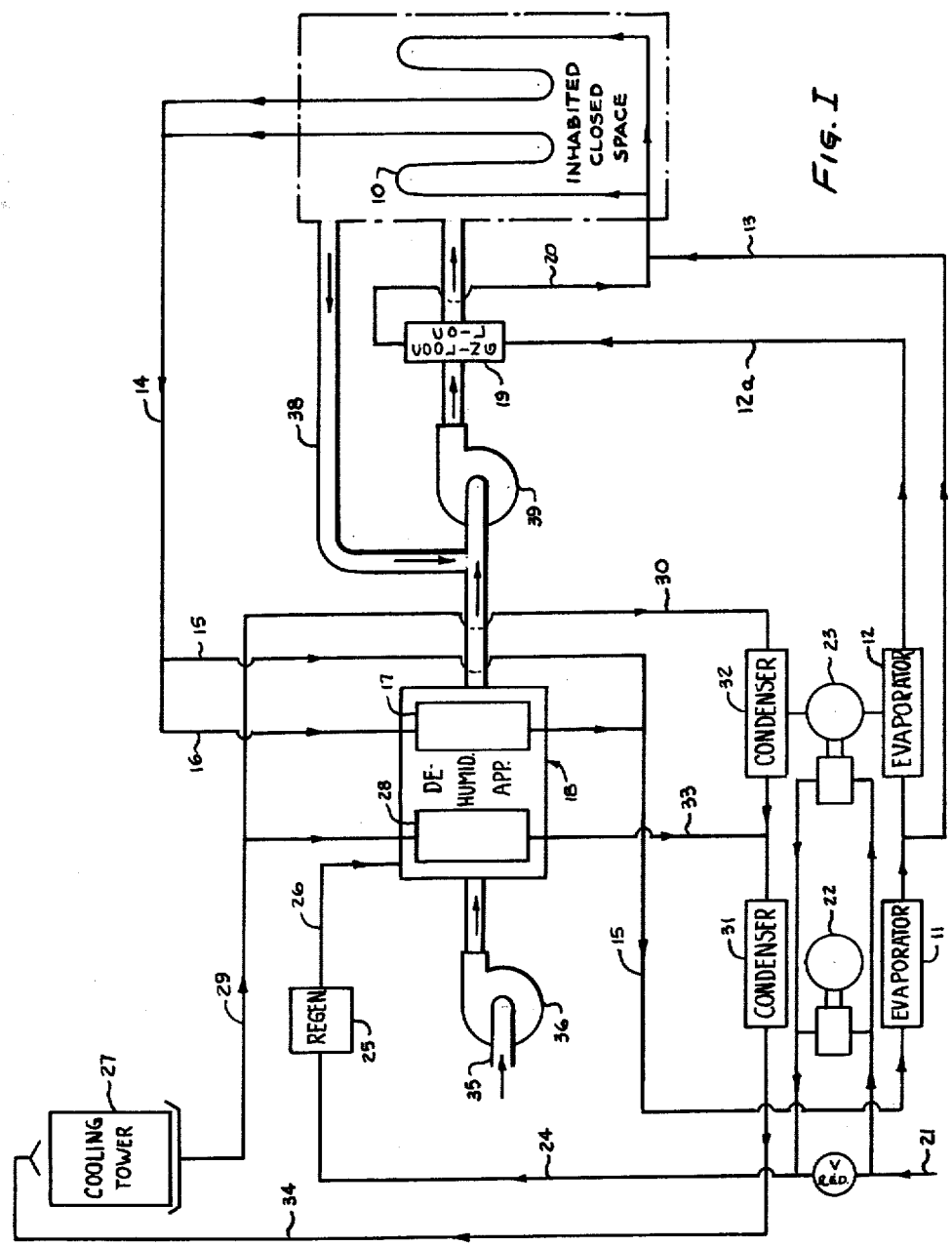

Sept. 3, 1963 G. MECKLER 3,102,399
SYSTEM FOR COMFORT CONDITIONING OF INHABITED CLOSED SPACES
Filed March 21, 1958

GERSHON MECKLER
INVENTOR

BY Owen & Owen
ATTORNEYS

United States Patent Office 3,102,399
Patented Sept. 3, 1963

3,102,399
SYSTEM FOR COMFORT CONDITIONING OF
INHABITED CLOSED SPACES
Gershon Meckler, Toledo, Ohio, assignor, by direct and
mesne assignments, to Space Conditioning Corporation,
Toledo, Ohio, a corporation of Ohio
Filed Mar. 21, 1958, Ser. No. 722,883
25 Claims. (Cl. 62—332)

This invention relates to the field generally referred to as "air conditioning" but encompassing a broader comprehension of the factors involved in the treatment of enclosed spaces for the comfort of human occupants and, therefore, more properly called "comfort conditioning."

In the following discussion, in the description of an embodiment of the invention and in the claims, the term "heat transfer mechanism" will be used to refer to any one of the basic mechanisms of convection, conduction, radiation and latent heat removal or dehumidification; the words "device" and "apparatus" being used to designate operative structures.

The conditions of temperature and humidity which exist within any inhabited enclosed space result, of course, not only from the body heat discharged by the occupants, but also from other heat transferred to and generated within that space. Large quantities of heat are transferred directly to any such space in the form of radiant energy from the sun which penetrates the windows and other glass surfaces. In addition, heat is generated by absorption of radiant energy from the sun, both by the building or other structure enclosing the space and by inanimate objects located within the space. Such radiant heat, after a period of lag to be discussed below, is transferred from the structure to the space enclosed. Sizeable quantities of heat are also given off within the enclosed space by various energy consuming mechanisms operating within the space, and converting energy which operates them to heat which is transferred to the enclosed space.

While all of the foregoing sources of problem heat and the general requirements for the comfort of a human being inhabiting the enclosed space under consideration are known in the art, little attention has been given to a further very important phenomenon which may be the determining factor in the achievement of a truly successful comfort-conditioning system. Problem heat in a space of the type under discussion, especially radiant heat received from the sun, is stored in the structural elements by which the space is enclosed and in inanimate objects located within the space. As heat is received by the structure, its temperature is gradually built up. After a lag of some hours depending, of course, upon the duration of the reception of the radiant heat, its intensity, the specific heat of the structural elements under consideration, their thermal conductivity, etc., the stored heat in the structural elements and inanimate objects reaches a temperature level higher than the space itself and begins to be released into the space under consideration.

Because most air conditioning systems rely almost entirely upon convective heat transfer, such systems cannot cope with stored heat unitl after the lag period when it can first be absorbed by an energy transfer medium. The energy transfer medium must have a sufficiently low temperature to effectuate transfer of the released heat at a rate sufficient to provide comfort. As a result, the usual solution has been the provision of a system capable of efficiently coping with the maximum heat load to which the enclosed space is subjected. Because the maximum load is far larger than the average problem heat load which must be compensated for, the equipment which has been designed for average enclosed spaces is almost always of much greater capacity than is needed except at this maximum point. As a result, both the initial and operating costs of such equipment are much higher than would be necessary for adequately maintaining comfort within the enclosed space during the majority of the time of its occupation or, in other words, to cope with the average problem heat load encountered.

For the most part, little attention has been paid to the utilization of radiant heat transfer mechanisms in connection with the problems to be solved. While radiant heating panels and radiators of the conventional hot water or steam types have long been used for transferring heat to enclosed spaces, their use for the removal of heat from enclosed spaces has not been developed to any great degree. To date, in fact, the art appears to have failed to make use of the radiant heat transfer mechanism effectively, and furthermore to have failed to take into consideration its use for the control of heat storage and stored heat release.

It is the principal object of this invention to provide a system for comfort conditioning of an enclosed space to be occupied by human beings which takes into account both the nature and proportions of the active current sources of heat, both sensible and latent, and also the heat storage capacity of the building structure and its contents, and is so designed as to transfer both sensible and latent heat either into or out of the building structure, as needed, in direct compensation for and in proportion to the excess or lack of heat and, at least generally, by means of the same heat transfer mechanisms by which the problem heat was initially generated, the system being integrated to the relative problem heat sources and nature.

It is another object of the invention to transfer heat from the space by the correlation of radiant, convection and latent heat transferral mechanisms in proportion to the generation of heat therein by human occupants, which achieves a high degree of comfort.

Another important object of this invention is to control the quantity of heat absorbed and stored by the building structure and its inanimate contents by transferring heat generated by absorption of radiant energy out of the space before it can become a problem. The system may thus reduce the peak heat load with which it must cope at any time; in a sense averaging the heat load and compensating for the problem heat by the use of transfer mechanisms most effective for the removal of the problem heat.

A further object of this invention is to achieve a high degree of thermo-dynamic efficiency in comfort conditioning by utilizing several heat or energy transfer mechanisms with each of them handling its respective portion of the problem heat or energy at the highest temperature level possible in order to expeditiously effect the heat or energy exchange. Heat from thermal storage, transmission and other convection heat transfer loads, whose temperatures are relatively low, must be removed by apparatus operating by the convection heat transfer mechanism and such apparatus requires an energy transfer medium at a temperature considerably lower than the temperature of the source heat, for example, chilled water at, say, 55° F.

In contrast, radiant energy from the sun and from lights is at an extremely high level. Therefore, a device for absorbing this energy can operate at a relatively high temperature, for example by the use of chilled water, say, at 65° F. Water at 65° F. is less expensive to provide than water at 55° F. and, in addition, the system of the invention includes the concept of the re-use of discharged convection cooling water in the radiation absorbing device, further increasing the overall thermal efficiency.

Again, because it is necessary only to reduce the humidity of an occupied space to a level of say 45% in order for the body to be comfortable, the latent heat removal mechanism (de-humidifying apparatus) can be operated using an energy transfer medium at a temperature level even higher than that for the radiant energy absorbing mechanism, say at 85° F.

Thus, each heat or enegy transfer mechanism employed in a system according to the invention is employed at the highest possible temperature, which achieves optimum thermal efficiency for the entire system.

In carrying out the objects of the invention, the process and apparatus of the invention may employ conventional equipment arranged in a system designed to separate and control each of radiation, convection, latent heat and heat storage. A number of different energy transfer media, such as steam and/or electricity, chilled water and water cooled by evaporation, are all employed. Each of these media is utilized at least twice.

It will be apparent, of course, that the chilled water required as an energy transfer medium may be obtained directly from, say, a deep well, thus eliminating the use of refrigeration equipment. Similarly, other substitutions may be made in the apparatus shown and discussed in the illustrative portions of this specification.

Regardless of the particular media employed, either as energy sources or as energy transfer media, the system of the invention is based upon the concept of staging devices which operate by different heat transfer mechanisms, e.g., through the dual or series use of an energy transfer medium. Systems according to the invention may employ more than one medium and may include the staging of more than two different devices for transferring heat each employing a different heat transfer mechanism. Various arrangements employing different media by which each medium is used to stage portions of at least two devices operating by different heat transfer mechanisms may also be operated according to the invention.

By properly balancing the sizes and capacities of the various apparatuses and devices, and by properly positioning these devices with respect to the source of heat, i.e., windows, energy consuming equipment, etc., the direct removal of problem energy may be accomplished to the desired degree, thus controlling the quantity of such energy which is permitted to become stored. The capacity of the apparatuses and devices is substantially reduced by eliminating the need for coping with an instantaneous peak load including the usual otherwise great quantity of stored heat.

The attached schematic drawings are intended to illustrate embodiments of devices and the flow of various energy transfer media through the devices according to the invention. The drawings are not intended to impose limitations upon the scope of the invention or to show the only arrangements of devices by which the process of the invention may be carried out. It will be understood, therefore, that in describing the devices and in applying the underlying concepts and theories of the invention thereto, the particular devices shown and their particular means of interconnection are only illustrative.

The drawing is a flow chart showing the connections and interconnections of a staged-mechanism air conditioning system according to the invention. The system illustrated employs conventional apparatuses but their mode of operation is determined and controlled by concepts underlying the invention which are discussed above.

Studies have revealed that the human body gives off heat in approximate proportions of 50% radiation, 25% convection and 25% latent (i.e., discharge of water vapor). In any particular system designed according to the invention, the apparatuses employed for heat transferral should be of such capacity, arrangement and configuration as to transfer their respective portions of the total problem heat in similar ratios, thus achieving optimum comfort conditions.

For any particular space, the type and proportions of other problem heat must similarly be analyzed, taking into consideration the locale, area of glass, structural material, inanimate contents, heat producing equipment, lights, etc., so that the increments of heat from each source and of each type can also be calculated. A system according to the invention is designed to include these factors in the capacity and particular shape and locations of the various apparatuses employed.

In addition the "thermal storage factor" must be calculated and the resulting "heat lag" determined so that the quantity of radiant energy to be directly absorbed and transferred out of the system before it heats the space, structure or contents, can be taken into consideration. The calculations for any particular space are not necessary to an explanation of the invention because they involve only well-known thermal load and transfer equations. However, the concept of thus controlling the quantity of energy removed before storage as heat and the remaining energy allowed to become stored must be considered in selecting the capacities and locations of the apparatuses to be employed.

While some heat may be both given off by the human body and otherwise delivered to the space by conduction, it is very small in proportion to that delivered to the space by radiation and convection and can be ignored.

Energy from the sun, although 100% radiation, can be so handled that its removal may be accomplished, for example, say 50% by direct radiation transfer and 50% by convection transfer from structure and contents after the heat storage lag.

The problem heat in general must be considered as being divided into two classes: sensible heat, transferable by radiation and convection and latent heat which requires mass transfer as well.

An air conditioning system embodying the invention, therefore, is so designed as to accomplish sensible heat removal by the two mechanisms of radiation and convection and in a ratio proportionate to the source heat, say 2:1, respectively. Because the radiant problem energy emanating from the sun and lights is at a high temperature level, the system embodying the invention uses relatively high level heat absorbing means in the radiative absorbing apparatus. Because it is easier to achieve this relatively high temperature than a lower temperature, that portion of the apparatus which absorbs heat by radiation transfer is less expensive initially and also operates at a substantially lower cost than apparatus operating at a lower level, yet achieves high thermal efficiency.

As an example, in the system illustrated in the drawing, radiant cooling coils, generally indicated at 10, are employed for transfer of energy from the space by the radiative transfer mechanism. As indicated in the figure, incoming water to these radiation cooling coils 10 may be at the relatively high temperature of 65° F. which is, of course, many degrees lower than the temperature of the problem radiant energy.

With respect to the heat which is to be removed by convective cooling, however, the temperature level of the problem heat is much lower than that of the problem radiative energy. It is necessary, therefore, to use a heat or energy transfer medium at a lower temperature in order to establish a sufficient temperature differential so that the heat will be exchanged at a satisfactory rate to accomplish the required cooling. For this reason, the cost of convective cooling for unit quantity of heat removed is higher both initially and in operating costs. However, because the invention accomplishes a large proportion of the sensible heat removal by the less costly and more efficient radiant energy transfer mechanism, only a small proportion of the total sensible heat to be removed must be transferred by convection so that the size of the apparatus and its initial cost are both substantially less than would be true if all of the heat were removed by convective cooling. Furthermore, as will be later explained, after the low level heat absorbing medium is employed in the convective cooling portions of the apparatus, and its temperature has been increased by heat absorption, it can still be employed directly in the radiative transfer apparatus at the higher level—this constituting a re-use of the same medium at a still effective temperature level. This further reduces the operating cost by increasing the overall thermal efficiency of the apparatus.

It is this concept and process of staging the heat absorbing mechanisms, i.e., convection and radiation, by the re-use of the medium employed which constitutes the fundamental underlying basis for the present invention.

The cooling water for the radiant cooling coil 10 at 65° F. is obtained in the system shown in the drawing from the output side of the first of a pair of chillers or evaporators 11 and 12. The chillers 11 and 12 are arranged in series and so designed that the output water from the chiller 11 is cooled only to 65° F., this water being delivered by a piping system, generally indicated by the line 13, which leads to the input side of the radiant cooling coils 10 and the input side of the chiller 12 which is so designed that its output is at 55° F. The quantity of 65° F. water delivered by the first chiller 11 to the piping 13 and thus to the radiant cooling coils 10 is determined by balancing between the radiant cooling apparatus and convection cooling apparatus and will be further described below.

Heat from radiant energy absorbed by the coils 10 raises the water to 70° F. The 70° F. water then flows through a piping system indicated by the line 14 which leads to a chilled water return line 15 and has a parallel branch 16 leading to the second stage, generally indicated at 17, of dehumidification apparatus 18. This water leaves the stage 17 at 80° F. and rejoins the return line 15 so that water supplied to the first chiller 11 enters that apparatus at a temperature determined by the proportioning between the 70° F. return water and the 80° F. discharge water from the dehumidification unit 17.

Cooling water for the convection cooling apparatus is delivered at 55° F. from the second chiller 12 through a line 12a to a convection cooling coil, generally indicated at 19, which constitutes a part of the convection heat transfer mechanism. The input water fed to the coil 19 at 55° F. is discharged at 65° F. having been raised in temperature, of course, by heat absorbed in the coil 19 from air circulated therethrough. 65° F. water from the coil 19 is combined by a branch line 20 with the 65° F. water flowing from the chiller 11 through the line 13 to the input side of the radiant cooling coils 10.

It will thus be seen that in a system according to the invention, such as the illustrative system shown in the drawing, a first stage or higher temperature chilled water is utilized directly in combination with discharge water from the output side of the convection cooling apparatus, to constitute the cooling medium at the input side of the radiant cooling apparatus. Second stage or lower temperature chilled water is utilized—first at a low temperature (55° F.) in the convection cooling apparatus where its lower temperature is required to effectively cause heat transfer by convection and, after functioning for this purpose, is re-used at the higher temperature level of 65° F. with the 65° F. chilled water from the first or higher temperature chiller.

The more expensive, lower temperature (second stage) chilled water is used directly in the convection cooling system which requires the lower temperature cooling medium. However, because only approximately 50% of the sensible cooling needs to be accomplished by convection, the capacity of the second stage chiller and the convection cooling system can be less than 50% of that required if the entire cooling job were to be performed by the convection transfer mechanism. Only that quantity of water necessary to transfer approximately 50% of the sensible heat needs to be chilled to the lower, second stage level.

The less expensive, higher temperature (first stage) chilled water is blended with the already used, higher temperature water (65° F.) at the output side of the convection cooling apparatus at the higher temperature level and is used in the radiation cooling apparatus where the higher temperature cooling medium is still most effective because of the extreme temperature differential between the problem energy and the cooling medium. This staging of the two heat transfer mechanisms is accomplished by sequential utilization of the chilled water as the staging medium or utility.

The two different heat transferral mechanisms, represented by the radiant cooling coils 10 and the convection cooling coils 19 are staged in sequence so that each is operated at the highest temperature level for heat transfer with respect to the temperature level of the problem heat to be transferred, thus achieving optimum thermal efficiency.

The coils 10 are referred to as "radiant cooling coils" for simplicity of phraseology because actually they function to absorb radiant energy. The coils 10 are utilized to transfer heat radiated as such to the coils 10 from sources within and without the space but their primary function is to directly absorb radiant energy before such energy is converted to heat within the space or the structure.

Radiant energy from lights, for example, may be directly absorbed with coils 10 located in ceiling panels. Similarly, such coils can be so placed that a controlled quantity of the radiant energy which enters a space through glass walls and windows may be caused to impinge upon and be absorbed by such coils, directly. This, in effect, removes the energy from the space before it is converted to sensible problem heat in the space and provides for control of the quantity of such energy permitted to become stored for later handling and removal.

Each of the other utilities (either heat transfer or motivating) is similarly utilized in a two stage operation where that medium at a lower level is employed in connection with one system of heat transfer and that same medium at a higher level is employed in connection with another system of heat transfer. Steam is utilized in the system illustrated in FIGURE 1 first at a pressure, for example, of 150 pounds per square inch (gauge) from a source indicated at 21 to drive compressors 22 and 23, respectively, for the chillers 11 and 12 in the production of chilled water for the staging of the convective and radiative transfer mechanisms as described above. Exhaust steam from the compressors 22 and 23 flows through a piping system, indicated at the line 24, to the input side of a regenerator 25 for the dehumidification apparatus 18, for example, at an exhaust pressure of 25 p.s.i.g.

In the exemplary apparatus shown in the drawing, the dehumidification apparatus 18 is a conventional piece of apparatus employing a liquid desiccant which absorbs moisture, is then heated to drive off the moisture and recirculated. Even at the lower pressure of 25 p.s.i.g., and thus the correspondingly lower temperature, the steam is still amply hot to drive off moisture from the desiccant and thus effect latent heat transfer between the air flowed through the coils of the dehumidification apparatus 18 and the outside area where the regenerator 25 is located.

In the flow chart of the drawing all of the required dessicant interconnections between the regenerator 25 and the dehumidification apparatus 18 are indicated by the single line 26.

As in the case of the energy transfer medium chilled water, steam as a utility is first used at a high level in connection with the operation of the chillers 11 and 12 in convective and radiative cooling mechanisms, and secondly, at a low level, in the regenerator 25 of the latent heat transferral mechanism.

In the same manner, cooling tower water is utilized in two stages and in connection with two different heat transferral mechanisms. In normal summer operations, a cooling tower 27 supplies water at, say, 85° F. to a first stage 28 of the dehumidification apparatus 18 by the line 29, to chill the desiccant. The 85° F. water is cooler than ambient outside air brought through the apparatus 18 to supply the space involved and moisture is driven out of the air. The 85° F. cooling tower water is also carried by a branch line 30 to the input side of the second of two condensers 31 and 32 related to the compressors 22 and 23 and chillers 11 and 12, respectively. The 85° F. cooling tower water entering the second condenser 32 is utilized to absorb heat from the second stage chiller 12 and is discharged from the condenser 32 at approximately 100° F. The discharge water from the first stage 28 of the dehumidification apparatus 18, having absorbed heat, is raised to approximately 100° F. and delivered by a line 33 to the input side of the first stage condenser with the 100° F. discharge water from the second condenser 32. Water is discharged from the condenser 31 at approximately 110° F. having absorbed heat from its chiller 11 and is pumped through a line 34 to the cooling tower 27.

As in conventional systems, this 110° F. water is chilled by evaporation in the cooling tower 27 to the 85° F. level. Cooling tower water is thus employed as a utility at a high temperature level in the first stage 28 of the latent heat transferral or dehumidification apparatus 18 and in the second stage 32 of the chilled water apparatus. The water discharged from the dehumidification stage 28 and the second stage condenser 32 is blended and re-used in the first stage condenser 31. The cooling tower water is thus used as a utility in the condenser 32 in connection with the convection transfer mechanism and in series in the latent heat transfer mechanism and in the condenser 31 in connection with the radiant transfer mechanism.

It will be remembered that a portion of the chilled water at 70° F. from the radiant coils 10 is delivered to the second stage 17 of the dehumidification apparatus 18 where it is employed to further chill the desiccant and cause further transfer of moisture thereto.

That portion of the heat transferral which is accomplished by means of the convection cooling mechanism is, of course, dependent upon a flow of air through suitable portions of the space to be cooled. The convection system, therefore, includes a fresh air source, generally indicated by the duct 35 and a blower 36. This fresh air is fed through the dehumidification apparatus 18 in two stages, first, the stage 28 where it is partially dehumidified at a level established by the input cooling tower water by 85° F. and then through the second stage 17 at a level established by the input of discharge chilled water from the radiant coils 10 at a 70° F. level. The fresh air after dehumidification is combined with a proportional amount of return air from ducts generally indicated at 38 and by means of a blower 39 fed to the convection cooling coils 19 when it is cooled to a temperature determined by the input, second stage chilled water at the 55° F. level.

All of the utilities, chilled water, steam, cooling tower water and air for the convection cooling apparatus, are employed in stages and at successive levels. Each of these several utilities functions to stage at least two different heat transferral metchanisms by the re-use of each utility. The full heat absorbing potential of each utility is employed at the most effective temperature levels in connection with the particular heat transferral mechanism where its utilization achieves high thermal efficiency. As a result, initial cost of equipment is much less than conventional air conditioning systems and operating costs are held lower.

It will be appreciated, of course, that the blending of the chilled water, cooling tower water and air in any particular installation is determined by the proportions and levels of the types of problem heat to be removed from the space in question.

I claim:

1. Apparatus for comfort conditioning of an inhabited closed space, said apparatus comprising at least four separate energy transfer devices, a first of said devices being effective to absorb energy from, and to remove water from, air circulated in contact therewith, a second of said devices being effective to reduce the sensible heat of air circulated in contact therewith and to affect the dew point of such circulated air, a third of said devices being effective, by convection heat transfer, to reduce the sensible heat of air circulated in contact therewith, and a fourth of said devices being effective to absorb radiant energy from the closed space, means for circulating air sequentially through the first, the second and the third of said devices and then into the closed space, a closed circulating system for transferring energy from the second, the third and the fourth of said transfer devices to an energy transfer medium, said circulating system being connected in series with at least two of said devices, refrigerating means operatively associated with said circulating system and effective to transfer energy from the energy transfer medium, and a second circulating system for transferring energy from the first of said transfer devices to a second energy transfer medium.

2. Apparatus for comfort conditioning of an inhabited closed space, said apparatus comprising at least four separate energy transfer devices, a first of said devices being effective to absorb energy from, and to remove water from, air circulated in contact therewith, a second of said devices being effective to reduce the sensible heat of air circulated in contact therewith and to affect the dew point of such circulated air, a third of said devices being effective to reduce, by convective heat transfer, the sensible heat of air circulated in contact therewith, and a fourth of said devices being effective to absorb radiant energy from the closed space, means for circulating air sequentially through the first, the second and the third of said devices and then into the closed space, a closed circulating system for transferring energy from the second, the third and the fourth of said transfer devices to an energy transfer medium, said circulating system being connected in series with at least two of said devices, and being effective to maintain the third of said devices at a predetermined low temperature level, the fourth at an intermediate temperature level, and the second at a higher temperature level, refrigerating means operatively associated with said circulating system and effective to transfer energy from the energy transfer medium, and a second circulating system for transferring energy from the first of said transfer devices to a second energy transfer medium, said second circulating system being effective to maintain the first of said devices at a temperature level above the higher level of the second of said devices.

3. Apparatus for comfort conditioning of an inhabited closed space, said apparatus comprising at least two separate energy transfer devices, including a first device which is effective to absorb energy principally by a first energy transfer mechanism and a second device effective to transfer energy by a different transfer mechanism, means for circulating air in heat transfer relationship with at least one of said devices and then into the closed space, and any of said devices which is not in heat transfer relationship with the circulated air outside the space being effective to absorb energy from the closed space, a closed circulating system for transferring energy from said two transfer devices, in series, to an energy transfer medium, and first and second evaporator-condenser refrigerating means connected in series with the chilled output of the second of the evaporators thereof connected to the input of the first of said devices by said circulating system, with the chilled output of the first of the evaporators thereof connected to the input of the second of the evaporators and to the input of the second of said devices by said circulating system, and with the output of the first of said devices connected to the input of the second of said devices by said circulating system.

4. Apparatus as claimed in claim 3 in which said circulating system includes return connections from the output of the second of said devices to the input of the evaporators of said evaporator-condenser refrigerating means.

5. Apparatus as claimed in claim 3 in which said circulating system includes a return connection from the second of said devices and said return connection includes a multiplicity of parallel lines, at least one of which leads through a third device.

6. Apparatus for comfort conditioning of an inhabited closed space, said apparatus comprising at least two separate energy transfer devices, a first of said devices being effective to absorb energy principally by a first energy transfer mechanism, and a second principally by a different energy transfer mechanism, means for circulating air in heat transfer relationship with at least one of said devices and then into the closed space, and any of said devices which is not in heat transfer relationship with the circulated air outside the space being effective to absorb energy from the closed space, a closed circulating system for transferring energy from said transfer devices to an energy transfer medium, and two evaporator-condenser refrigerating means relative to which said circulating system is staged with the output of the evaporator of the first of said refrigerating means connected to the input of the second of said heat transfer devices and the output of the evaporator of the second of said refrigerating means connected to the input of the first of said devices, and with the output of the first of said devices connected to the input of the second of said devices in common with the output of the evaporator of the first of said refrigerating means, and said circulating system also including a return line from the output of the second of said devices to the input of the evaporators of said refrigerating means.

7. Apparatus as claimed in claim 6 and a latent heat transfer device, in which the return line of said circulating system includes a branch line leading to and continuing from said latent heat transfer device enroute to one of the evaporators of said condenser-evaporator refrigerating means.

8. Apparatus as claimed in claim 6 and means for absorbing heat from said energy transfer medium at said refrigerating means and for delivering such absorbed heat externally of the space under consideration.

9. Apparatus as claimed in claim 8 in which the means for absorbing heat at said refrigerating means is a separate heat transfer medium and which has a separate circulating system for such separate medium including an evaporative cooling tower and a return line therefrom to and from the condenser of said refrigerating means.

10. Apparatus as claimed in claim 9, and a latent heat transfer device connected by said separate circulating system in the return path from said evaporative cooling tower, said latent heat transfer device also having a part included in the return line from the second of said energy transfer devices to the evaporators of said refrigerating means.

11. Apparatus as claimed in claim 10 in which the air is circulated first through the portion of said latent heat transfer device which is in the return path from said evaporative cooling tower, then through the portion of said latent heat transfer device which is included in the return line from the second of said energy transfer devices to the evaporators of said evaporator-condenser refrigerating means, and finally through said devices.

12. Apparatus as claimed in claim 10 in which the return line from the second of said energy transfer devices is connected by the first said circulating system to the evaporator of the first of said refrigerating means and the return line of the second said circulating system is connected through said latent heat transfer device and, in common with the output of the condenser of the second of said refrigerating means, to the input side of the condenser of the first of said refrigerating means.

13. Apparatus for comfort conditioning of an inhabited closed space, said apparatus comprising at least three separate energy transfer devices, a first of said devices being a dehumidifier which employs a desiccant, and effective to absorb energy from, and to remove water from, air circulated in contact therewith, a second of said devices being a dehumidifier which employs a desiccant, and effective to reduce the sensible heat of air circulated in contact therewith and to affect the dewpoint of such circulated air, and a third of said devices being effective to absorb radiant energy from the closed space, means for circulating fresh air sequentially through the first and the second of said devices and then into the closed space, a circulating system for transferring energy from the second and the third of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain said first device at a temperature above the predetermined maximum.

14. Apparatus for comfort conditioning of an inhabited closed space, said apparatus comprising at least three separate energy transfer devices, a first of said devices being a dehumidifier which employs a desiccant, and effective to absorb energy from, and to remove water from, air circulated in contact therewith, a second of said devices being a dehumidifier which employs a desiccant, and effective to reduce the sensible heat of air circulated in contact therewith and to affect the dewpoint of such circulated air, and a third of said devices being effective to absorb radiant energy from the closed space, means for circulating fresh air sequentially through the first and the second of said devices and then into the closed space, a circulating system for transferring energy from the second and the third of said transfer devices to an energy transfer medium, said circulating system being effective to maintain the second of said devices at a predetermined low temperature and the third of said devices at an intermediate temperature higher than the predetermined low temperature, refrigerating means operatively associated with said circulating system and effective to transfer energy from the energy transfer medium, and a second circulating system for transferring energy from the first of said transfer devices to a second energy transfer medium, said second circulating system being effective to maintain said first device at a temperature above the intermediate temperature.

15. Apparatus for comfort conditioning of an inhabited closed space, said apparatus comprising at least three separate energy transfer devices, a first of said devices being a dehumidifer which employs a liquid desiccant, a second of said devices being a dehumidifer which employs a liquid desiccant, and a third of said devices being effective to absorb radiant energy from the closed space, means for circulating fresh air sequentially through the first and the second of said devices and then into the closed space, a circulating system for transferring energy from the second and the third of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain said first device at a temperature above the predetermined maximum.

16. Apparatus for comfort conditioning of an inhabited closed space, said apparatus comprising at least three separate energy transfer devices, a first of said devices being a dehumidifier which employs a liquid desiccant, a second of said devices being a dehumidifier which employs a liquid desiccant, and a third of said devices being effective to absorb radiant energy from the closed space, means for circulating fresh air sequentially through the first and the second of said devices and then into the closed space, means for withdrawing air from the closed space, and for mixing withdrawn air with air discharged from the second of said devices for return to the space, a circulating system for transferring energy from the second and the third of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain said first device at a temperature above the predetermined maximum.

17. Apparatus for comfort conditioning of an inhabited closed space, said apparatus comprising at least four separate energy transfer devices, a first of said devices being effective to absorb energy from, and to remove water from, air circulated in contact therewith, a second of said devices being effective to reduce the sensible heat of air circulated in contact therewith and to affect the dewpoint of such circulated air, a third of said devices being effective to reduce, by convective heat transfer, the sensible heat of air circulated in contact therewith, and a fourth of said devices being effective to absorb radiant energy from the closed space, means for circulating air sequentially through the first, the second and the third of said devices and then into the closed space, heat transferring means for absorbing energy from the second, the third and the fourth of said transfer devices, said heat transferring means being effective to maintain the third of said devices at a predetermined low temperature level, and the fourth at an intermediate level, and the second at a higher level, and second heat transferring means for absorbing energy from the first of said transfer devices, and said second heat transferring means being effective to maintain the first of said devices at a temperature level above the higher level.

18. Apparatus for comfort conditioning of an inhabited closed space, said apparatus comprising at least four separate energy transfer devices, a first of said devices being effective to absorb energy from, and to remove water from, air circulated in contact therewith, a second of said devices being effective to reduce the sensible heat of air circulated in contact therewith and to affect the dew point of such circulated air, a third of said devices being effective to reduce, by convective heat transfer, the sensible heat of air circulated in contact therewith, and a fourth of said devices being effective to absorb radiant energy from the closed space, means for circulating fresh air sequentially through the first, the second and the third of said devices and then into the closed space, a closed circulating system for transferring energy from the second, the third and the fourth of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain the first of said devices at a temperature level above the predetermined maximum.

19. Apparatus for comfort conditioning of an inhabited closed space, said apparatus comprising at least four separate energy transfer devices, a first of said devices being effective to absorb energy from, and to remove water from, air circulated in contact therewith, a second of said devices being effective to reduce the sensible heat of air circulated in contact therewith and to affect the dew point of such circulated air, a third of said devices being effective to reduce, by convective heat transfer, the sensible heat of air circulated in contact therewith, and a fourth of said devices being effective to absorb radiant energy from the closed space, means for circulating fresh air sequentially through the first, the second and the third of said devices and then into the closed space, a closed circulating system for transferring energy from the second, the third and the fourth of said transfer devices to an energy transfer medium, said circulating system being effective to maintain the third of said devices at a predetermined low temperature level, the fourth at an intermediate temperature level, and the second at a higher temperature level, refrigerating means operatively associated with said circulating system and effective to transfer energy from the energy transfer medium, and a second circulating system for transferring energy from the first of said transfer devices to a second energy transfer medium, said second circulating system being effective to maintain the first of said devices at a temperature level above the higher level of the second of said devices.

20. Apparatus for comfort conditioning of an inhabited closed space, said apparatus comprising at least four separate energy transfer devices, a first of said devices being a dehumidifier which employs a liquid desiccant, a second of said devices being a dehumidifier which employs a liquid desiccant, a third of said devices being effective to reduce, by convective heat transfer, the sensible heat of air circulated in contact therewith, and a fourth of said devices being effective to absorb radiant energy from the closed space, means for circulating fresh air sequentially through the first, the second and the third of said devices and then into the closed space, a closed circulating system for transferring energy from the second, the third and the fourth of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain the first of said devices at a temperature level above the predetermined maximum.

21. Apparatus for comfort conditioning of an inhabited closed space, said apparatus comprising at least four separate energy transfer devices, a first of said devices being a dehumidifier which employs a liquid desiccant, a second of said devices being a dehumidifier which employs a liquid desiccant, a third of said devices being effective to reduce, by convective heat transfer, the sensible heat of air circulated in contact therewith, and a fourth of said devices being effective to absorb radiant energy from the closed space, means for circulating fresh air sequentially through the first, the second and the third of said devices and then into the closed space, means for withdrawing air from the closed space, and for mixing withdrawn air with air discharged from the second of said devices for recirculation through the third of said devices and return to the space, a closed circulating system for transferring energy from the second, the third and the fourth of said transfer devices to an energy transfer medium, said circulating system being effective to maintain said devices at a temperature below a predetermined maximum, refrigerating means operatively associated with said circulating system and effective to transfer energy from the energy transfer medium, and a second circulating system for transferring energy from the first of said transfer devices to a second energy transfer medium, said second circulating system being effective to maintain the first of said devices at a temperature level above the predetermined maximum.

22. Apparatus for comfort conditioning of an inhabited closed space, said apparatus comprising at least four separate energy transfer devices, a first of said devices being a dehumidifier which employs a desiccant, and effective to absorb energy from, and to remove water from, air circulated in contact therewith, a second of said devices being a dehumidifier which employs a desiccant, and effective to reduce the sensible heat of air circulated in contact therewith and to affect the dew point of such circulated air, a third of said devices being effective to absorb radiant energy from the closed space, and a fourth of said devices being effective to absorb heat from an energy transfer medium at a temperature below a predetermined maximum, and to reject such heat to a second energy transfer medium at a temperature above the predetermined maximum, means for circulating fresh air sequentially through the first and the second of said devices and then into the closed space, a circulating system for transferring energy from the second and the third of said transfer devices to an energy transfer medium, and from the medium to the fourth of said devices, said circulating system being effective to maintain the medium at a temperature below the predetermined maximum, and a second circulating system for transferring energy from the first and the fourth of said transfer devices to a second energy transfer medium, said second circulating system being effective to maintain the second transfer medium at a temperature above the predetermined maximum.

23. Apparatus for comfort conditioning of an inhabited closed space, said apparatus comprising at least four separate energy transfer devices, a first of said devices being a dehumidifier which employs a liquid desiccant, a second of said devices being a dehumidifier which employs a liquid desiccant, a third of said devices being effective to absorb radiant energy from the closed space, and a fourth of said devices being a steam powered means effective to absorb heat from an energy transfer medium at a temperature below a predetermined maximum, and to reject such heat to a second energy transfer medium at a temperature above the predetermined maximum, means for circulating fresh air sequentially through the first and the second of said devices and then into the closed space, means for regenerating liquid desiccant from the first and the second of said devices, a circulating system for transferring energy from the second and the third of said transfer devices to an energy transfer medium, and from the medium to the fourth of said devices, said circulating system being effective to maintain the medium at a temperature below the predetermined maximum, a second circulating system for transferring energy from the first and the fourth of said transfer devices to a second energy transfer medium, said second circulating system being effective to maintain the second transfer medium at a temperature above the predetermined maximum, and a third circulating system for delivering steam in driving relationship relative to the fourth of said devices for receiving spent steam therefrom, and for delivering the spent steam to said regenerating means.

24. Apparatus for comfort conditioning of an inhabited closed space, said apparatus comprising at least three separate energy transfer devices, a first of said devices being a dehumidifier including a desiccant effective to remove water from air circulated in contact therewith, a second of said devices being a dehumidifier including a desiccant effective to reduce the sensible heat of, and to remove water from, air circulated in contact therewith, and a third of said devices being effective to absorb radiant energy from the closed space, means for circulating fresh air sequentially through the first and the second of said devices and then into the closed space, a transferring means effective to absorb energy from the second and the third of said transfer devices and to transfer such absorbed energy to an energy transfer medium, said transferring means being effective to maintain said devices at a temperature below a predetermined maximum, means operatively associated with said transferring means and effective to transfer energy from the energy transfer medium, and a circulating system for transferring energy from the first of said transfer devices to a second energy transfer medium, said circulating system being effective to maintain said first device at a temperature above the predetermined maximum.

25. Apparatus for comfort conditioning of an inhabited closed space, said apparatus comprising at least three separate energy transfer devices, a first of said devices being a dehumidifier which employs a desiccant, and effective to absorb energy from, and to remove water from, air circulated in contact therewith, a second of said devices being a dehumidifier which employs a desiccant, and effective to reduce the sensible heat of air circulated in contact therewith and to affect the dew point of such circulated air, and a third of said devices being effective to absorb radiant energy from the closed space, means for circulating fresh air sequentially through the first and the second of said devices and then into the closed space, a transferring means effective to absorb energy from the second and the third of said transfer devices and to transfer such absorbed energy to an energy transfer medium, said transferring means being effective to maintain said devices at a temperature below a predetermined maximum, means operatively associated with said transferring means and effective to transfer energy from the energy transfer medium, and a circulating system for transferring energy from the first of said transfer devices to a second energy transfer medium, said circulating system being effective to maintain said first device at a temperature above the predetermined maximum.

References Cited in the file of this patent

UNITED STATES PATENTS

| | | |
|---|---|---|
| 1,980,688 | Lewis | Nov. 13, 1934 |
| 2,127,991 | Candor | Aug. 23, 1938 |
| 2,257,485 | Sewell | Sept. 30, 1941 |
| 2,286,538 | Guler | June 16, 1942 |
| 2,660,409 | Pittenger et al. | Nov. 24, 1953 |
| 2,698,524 | Rygard | Jan. 4, 1955 |
| 2,907,178 | McNatt | Oct. 6, 1959 |
| 3,009,331 | Hewett | Nov. 21, 1961 |

OTHER REFERENCES

"Radiant Heating" by T. Napier Adlam, published by the Industrial Press, 148 Lafayette Street, New York 13, New York. Only the following pages are needed: pages 289, 290, 293, 294, 319 and 320.

UNITED STATES PATENT OFFICE

CERTIFICATE OF CORRECTION

Patent No. 3,102,399                                                                  September 3, 1963

Gershon Meckler

It is hereby certified that error appears in the above numbered patent requiring correction and that the said Letters Patent should read as corrected below.

In the drawing, a line should appear directly connecting condenser 31 to evaporator 11 and a line directly connecting condenser 32 and evaporator 12; column 1, line 60, for "unitl" read -- until --; column 4, line 42, for "radiative" read -- radiation --; line 45, for "radiation" read -- radiative --; column 8, line 12, for "convection" read -- convective --.

Signed and sealed this 29th day of September 1964.

(SEAL)
Attest:

ERNEST W. SWIDER                                                     EDWARD J. BRENNER
Attesting Officer                                                        Commissioner of Patents